(12) United States Patent
Endo et al.

(10) Patent No.: US 9,607,767 B2
(45) Date of Patent: Mar. 28, 2017

(54) LAMINATE-TYPE CERAMIC ELECTRONIC COMPONENT

(71) Applicant: TDK CORPORATION, Tokyo (JP)

(72) Inventors: Makoto Endo, Tokyo (JP); Koichi Yamaguchi, Tokyo (JP); Keisuke Ishida, Tokyo (JP)

(73) Assignee: TDK Corporation, Tokyo (JP)

( * ) Notice: Subject to any disclaimer, the term of this patent is extended or adjusted under 35 U.S.C. 154(b) by 229 days.

(21) Appl. No.: 14/462,244

(22) Filed: Aug. 18, 2014

(65) Prior Publication Data

US 2015/0055273 A1 Feb. 26, 2015

(30) Foreign Application Priority Data

Aug. 23, 2013 (JP) ................... 2013-173378
Jun. 12, 2014 (JP) ................... 2014-121271

(51) Int. Cl.
*H01G 4/30* (2006.01)
*H01G 2/14* (2006.01)
*H01G 4/06* (2006.01)
*H01G 4/12* (2006.01)
*H01C 7/10* (2006.01)
*H01C 7/18* (2006.01)
*H01C 7/00* (2006.01)

(52) U.S. Cl.
CPC ........... *H01G 4/1227* (2013.01); *H01C 7/008* (2013.01); *H01C 7/1006* (2013.01); *H01C 7/18* (2013.01); *H01G 4/30* (2013.01); *H01C 7/003* (2013.01)

(58) Field of Classification Search
CPC ........... H01G 4/30; H01G 4/1227; H01G 2/14
USPC ...................... 361/321.1, 321.2, 321.5, 301.4
See application file for complete search history.

(56) References Cited

U.S. PATENT DOCUMENTS

| 2004/0176239 A1* | 9/2004 | Nakamura ........... H01G 4/1227 501/138 |
| 2012/0003450 A1* | 1/2012 | Motoya ................... B32B 18/00 428/213 |
| 2015/0279565 A1 | 10/2015 | Teraoka et al. |

FOREIGN PATENT DOCUMENTS

| JP | A-06-124807 | 5/1994 |
| JP | 2000-243648 A | 9/2000 |
| JP | B2-3531543 | 3/2004 |
| JP | B2-3531543 | 5/2004 |

* cited by examiner

*Primary Examiner* — Eric Thomas
*Assistant Examiner* — Arun Ramaswamy
(74) *Attorney, Agent, or Firm* — Oliff PLC

(57) ABSTRACT

A laminate-type ceramic electric component such as laminated ceramic capacitor which has excellent mechanical strength and also has thermal shock resistance at the same time is provided. A laminate-type ceramic electronic component includes an inner layer part, in which dielectric layers including $ABO_3$ (which represents a perovskite crystal in which A contains at least Ba and B contains at least Ti) as a main component and internal electrode layers are alternately laminated; and a pair of outer layer parts which sandwich the inner layer part, wherein the outer layer parts include a continuous film containing a Ba—Si—Ti—O based crystal phase.

8 Claims, 3 Drawing Sheets

LAMINATE-TYPE CERAMIC ELECTRONIC COMPONENT

The present invention relates to a laminate-type ceramic electronic component such as a laminated ceramic capacitor or the like.

BACKGROUND

Accompanying with the miniaturization or thinning of electronic equipments, the development has been progressed for the miniaturization and low profile of the electronic components mounted in electronic equipments. Laminated ceramic capacitors with a product shape of 0.6 mm×0.3 mm×0.3 mm are extensively used in mobile phones, especially in smart phone. Recently, components with a size of 0.4 mm×0.2 mm×0.2 mm are also used.

Portable equipments represented by mobile phones and smart phones require high mechanical strength for the sake of the high possibility for subjecting to shock caused by falling on use. Further, high thermal shock resistance is also required to endure the harsh conditions such as in a car under blazing sun or in the outdoors with a temperature below zero or the like.

Patent document 1 discloses a technique for improving mechanical strength and moisture resistance by coating the entire outer surface of the sintered ceramic body with oxide glass.

Further, patent document 2 discloses a method for enhancing the mechanical strength by sandwiching the outer ceramic part with oxide layers having a high strength.

PATENT DOCUMENTS

Patent Document 1: JP3531543B
Patent Document 2: JPH6-124807A

SUMMARY

However, accompanying with the thinning of the electronic components, even though the mechanical strength could be retained, a disadvantage of degradation the thermal shock resistance results. Thus, it is difficult to balance the mechanical strength and the thermal shock resistance in the thinning.

In the technique of patent document 1, although the bending resistance against bending of substrate has been improved, problems concerning the thermal shock resistance are not described. When the thermal shock caused during mounting using such as soldering or caused by the outside environment in use is repeatedly generated, there were problems in which peeling off will occur due to the stress caused by the thermal expansion and contraction of the bonding surface between the oxide glass on the outer surface and the sintered ceramic body, and thus an desired strength cannot be obtained.

In patent document 2, since the thermal expansion coefficient of the outer layer comprising $Fe_2O_3$ or glass as a main component is larger than that in the inner layer, there is residual stress in the outer layer part. Although the strength against the tensile stress can be retained, the thermal shock resistance cannot be satisfied.

The present invention is accomplished in view of such actual circumstance, and it is the object of the present invention to provide a laminate-type ceramic electronic component such as laminated ceramic capacitor which has excellent mechanical strength and also has thermal shock resistance at the same time even with a low-profile shape.

In order to solve the above-mentioned problems, a laminate-type ceramic electronic component according to the present invention comprises inner layer part, in which dielectric layers comprising $ABO_3$ ($ABO_3$ represents a perovskite crystal in which A contains at least Ba, and B contains at least Ti) as a main component and internal electrode layers are alternately laminated, and a pair of outer layer parts which sandwich the inner layer part, wherein the outer layer parts comprise a continuous film containing a Ba—Si—Ti—O based crystal phase.

In addition, preferably, the Ba—Si—Ti—O based crystal phase contains a $Ba_2TiSi_2O_8$ (fresnoite) crystal phase as the main phase. Since the thermal expansion coefficients of $Ba_2TiSi_2O_8$, the dielectric layers and the outer layer parts are similar, cracks caused by the difference of the thermal expansions can be suppressed.

In addition, preferably, the thickness of the continuous film is 0.2~4.0 μm.

By satisfying the above-mentioned range, a sufficient mechanical strength can be imparted, and the deviation of the strength can be reduced.

In addition, preferably, the thickness of the continuous film is 1~20% relative to the outer layer part.

By satisfying the above-mentioned range, the thermal shock resistance can be further increased.

According to the present invention, by providing a continuous film of Ba—Si—Ti—O based crystal phase on the continuous film of the outer layer, a laminate-type ceramic electronic component which has a high mechanical strength and the strength of which is less decreased even subjected to a thermal shock can be provided.

DETAILED DESCRIPTION OF EMBODIMENTS

Hereinafter, the preferred embodiments of the present invention will be described with reference to the drawings. However, the present invention is not limited to the following embodiments. Further, the same symbol is imparted to the same or similar member, and the repeated descriptions will be appropriately omitted. In addition, the drawings are exemplary, and the size ratios between the components or the shapes of the components or the like may be different from the actual one.

<Laminate-type Ceramic Electronic Component (Laminated Ceramic Capacitor)>

Figure 1:
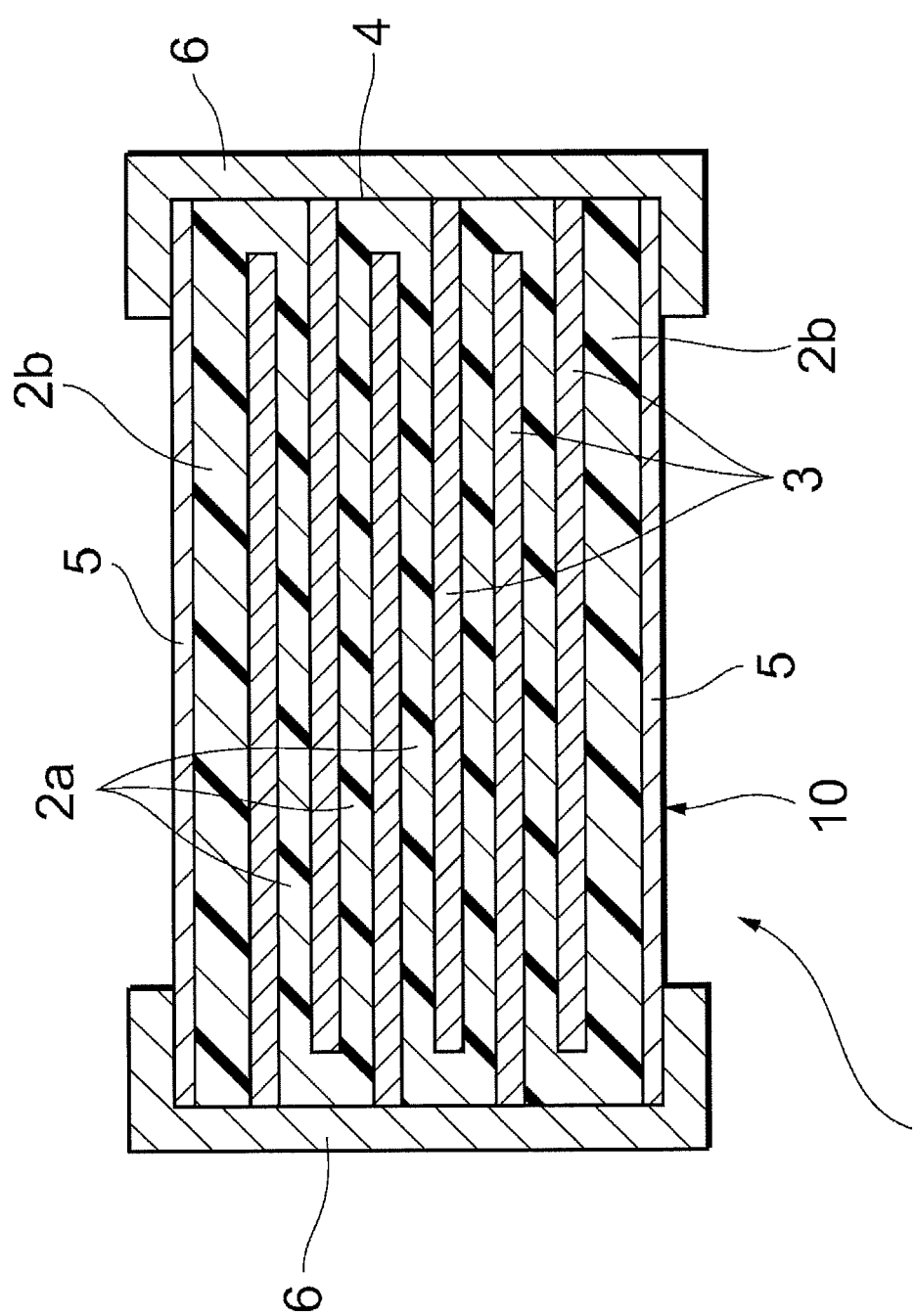
FIG. 1 is a schema of the cross section of the laminated ceramic capacitor as an embodiment of the present invention.

As an embodiment of the laminate-type ceramic electronic component of the present invention, FIG. 1 shows a schematic cross-section view of a laminated ceramic capacitor. As shown in FIG. 1, a laminate-type ceramic electronic component (laminated ceramic capacitor) 1 according to an embodiment of the present invention has an element body 10 with a structure formed by laminating dielectric layers 2a and internal electrode layers 3 alternately. There are outer layers 2b so as to sandwich the internal electrode positioned outermost.

In addition, a continuous film 5 comprising Ba—Si—Ti—O based crystal phase as a main component is formed on the outer layers 2b. Further, the continuous film 5 is not necessary to be exposed at the outer surface and may be coated by a protective layer on the outer surface if necessary.

The internal electrode 3 is formed so that a pair of internal electrode layers is alternately exposed from the both end surfaces 4 of the element body 10 respectively. One of internal electrodes 3 alternately laminated is electrically connected relative to the inner side of terminal electrode 6 which is formed so as to cover one end surface 4 of the element body 10. Further, the other of internal electrodes 3 alternately laminated is electrically connected with respect to the inner side of terminal electrode 6 which is formed on the outer side of the other end surface 4 of the element body 10.

The shape of the element body 10 is not particularly limited and may be appropriately selected according to the aims and the application, and the shape is usually formed as a rectangular parallelepiped. Also as for the size, there is no particular limitation, and it may be appropriately selected according to the aims and the application, and is usually about length (0.4~3.2 mm)×width (0.2~2.5 mm)×height (0.2~1.9 mm).

The dielectric layers 2a and the outer layers 2b are formed of a dielectric ceramic composition of the embodiment of the present invention. The dielectric ceramic composition is composed of dielectric particles, which is a compound having a perovskite crystal structure and represented by $ABO_3$ as a main component. A contains at least Ba, and B contains at least Ti.

Further, the molar ratio of the A-site atom and the B-site atom is expressed as the A/B ratio, and in the present invention, the A/B ratio is preferably 0.98~1.02.

In the present embodiment, depending upon the desired properties, the above-mentioned dielectric particles may also contain additional component elements. As additional component elements, there is no particular limitation, and at least one selected from the group consisting of rare earth elements and Mg is preferred. In addition, an oxide containing at least one selected from the group consisting of Si, Ge and Al may also be included.

When the rare earth elements are represented by R, the content of rare earth element oxides, which may be determined according to the desired properties, is preferably 0.2~2.0 moles, more preferably 0.5~1.5 moles, with respect to 100 mol of $ABO_3$, in terms of $R_2O_3$, By containing rare earth elements, there is a merit of improving the lifetime characteristic.

The rare earth element is at least one selected from the group consisting of Sc, Y, La, Ce, Pr, Nd, Pm, Sm, Eu, Gd, Tb, Dy, Ho, Er, Tm, Yb and Lu, preferably at least one selected from the group consisting of Y, Dy, Gd, and Ho.

In the present embodiment, the above-mentioned dielectric particles may contain other auxiliary components.

For example, the oxide of Mn and/or Cr may be included. With respect to 100 moles of $ABO_3$, in terms of each oxide, the content of the oxide is preferably 0.02~0.30 moles.

In addition, the oxide of at least one element selected from the group consisting of V, Ta, Nb, Mo, and W may be included. With respect to 100 moles of $ABO_3$, in terms of each oxide, the content of the oxide is preferably 0.02~0.30 moles.

The thickness of the outer layers 2b may be appropriately determined depending on the aim and the application. It is preferably 2 μm~80 μm, more preferably 10 μm~40 μm.

Being configured with the thickness in the above-mentioned range, the arrangement of the continuous film of Ba—Si—Ti—O based crystal phase may make a great contribution to the improvement of the mechanical strength.

The thickness of the dielectric layer 10 may be appropriately determined depending on the aim and application. It is preferably 1.0 μm or less, and more preferably 0.7 μm or less.

The continuous film 5 does not necessarily exist on the entire surface of the outer layer part 2b without gap, but can be formed by the continuous film in which the area ratio of the part which is exposed without covered by the continuous film 5 is 10% or less. The continuous film 5 is formed by crystals selected from the group consisting of $Ba_2TiSi_2O_8$, $BaTiSiO_5$, $BaTiSi_2O_7$, and $BaTiSi_3O_9$, and may be non-single phase.

In addition, by using $Ba_2TiSi_2O_8$ (fresnoite) as the main phase to occupy a volume fraction of 70%, in addition to form a continuous film with less gap, the stress load caused by the difference between the thermal expansion behaviors of the outer layer part and the continuous film may be inhibited, and thus the thermal shock resistance can be increased.

In addition, in the above-mentioned crystal, Ba may be partially substituted by at least one element selected from the group consisting of Ca and Sr.

In addition, in the above-mentioned crystal, Ti may be partially substituted by at least one element selected from the group consisting of Zr, Al and Hf.

In addition, in the above-mentioned crystal, Si may be partially substituted by Ge.

In order to impart sufficient mechanical strength to the electronic component of the present invention and reduce the deviation of strength, the thickness of the continuous film 5 is preferably 0.2~4.0 μm, more preferably 0.4~2.0 μm.

The thickness of the continuous film 5 is preferably 1~20% relative to the thickness of the outer layer part 2b.

By satisfying the above-mentioned range, the stress applied to the electronic component when the temperature of the outside environment changes can be prevented from concentrating in the continuous film, thereby to make the thermal shock resistance more excellent.

The conductive materials contained in the external electrodes 6 are not particularly limited, but inexpensive materials such as Ni, Cu or their alloys may be used in the present invention.

In addition, a resin electrode layer formed of conductive resin which has thermosetting resin and conductive particles as a main component may be provided on the outer electrode layers 6 respectively.

<Manufacturing Method of a Laminated Ceramic Capacitor>

The laminated ceramic capacitor 1 of the present embodiment is manufactured similarly to the conventional laminated ceramic capacitor by preparing a green chip by a usual printing method using the paste or a sheet method, and after the green chip has been fired, printing or transferring external electrodes, then firing. Hereinafter, the manufacturing method will be described in detail.

First, a dielectric raw material for forming dielectric layers is prepared, and it is made into paint, thereby to prepare a paste for the dielectric layers.

As the dielectric raw material, first, a raw material of $ABO_3$, a raw material of the oxide of Mg, a raw material of the oxides of R, and a raw material of the oxide containing Si are prepared. As these raw materials, the oxides of the components described above, their mixtures, or composite oxides can be used. Further, they can also be selected properly from various compounds to be oxides or composite oxides described above by firing, and they can be used in combination. As various compounds, for example, carbonate, oxalate salt, nitrates, hydroxides, organometallic compounds or the like may be exemplified.

In addition, the raw material of $ABO_3$ which is prepared by a variety of methods of the so-called solid phase method, and various liquid phase methods (for example, the oxalate method, the hydrothermal synthesis method, the alkoxide method and the sol-gel method or the like), can be used.

In addition, in the case that the components other than the main components and auxiliary components described above are contained in the dielectric layers, as a raw material for these components, in the same manner as described above, the oxides of these components, their mixtures, or composite oxides can be used. Further, various compound oxides or composite oxides described above by firing can also be used.

The content of each compound in the dielectric raw material may be determined in the manner that the composition of the dielectric ceramic composition after firing as described above is obtained. In the state before painting, the particle diameter of the dielectric raw material is typically an average particle diameter of about 0.1~1 μm.

The paste for dielectric layers may be prepared by mixing the dielectric powders containing $ABO_3$ and additional component compounds obtained above with organic vehicle.

The organic vehicle is obtained by dissolving a binder in an organic solvent. The binder is not particularly limited and may be properly selected from a variety of well-known binders of ethyl cellulose, and polyvinyl butyral or the like. The organic solvent is not particularly limited either, and depending on the printing method or sheet method or the like, it may be appropriately selected from various organic solvents of terpineol, butyl carbitol, acetone, and toluene or the like.

The paste for the dielectric layers is prepared by mixing the conductive materials composed of conductive metals or alloys and the organic vehicle described above. As the metal used as conductive materials, Ni or Ni alloys are preferable.

Then, the paste for the dielectric layers is made to be a green sheet shape by printing method or the like, and the paste for internal electrode layers is printed on the green sheet to form an internal electrode pattern layer. A plurality of green sheets in which the internal electrode pattern layers obtained as above, have been printed thereon are laminated to obtain a green chip.

Then, the obtained green chip is supplied to the binder removal process, and the organic components are removed by heating. After that, element body 10 is obtained through firing process, annealing process and continuous film forming process. Then, terminal electrode 6 is formed on the obtained element body 10, and thereby the laminate-type electronic component is manufactured.

In addition, the continuous film forming process may be performed at the same time with the firing process, annealing process, or before or after the firing process, annealing process.

As the condition in the binder removal process, the temperature increasing rate is preferably 5~300° C./h, and the holding temperature is preferably 500~800° C., and the temperature holding time is preferably 0.5~24 hours. Further, the atmosphere gas is air or a reducing atmosphere gas.

As the condition in the firing process, the temperature increasing rate is preferably over 500° C./h.

The holding temperature is preferably 1100~1350° C., and the holding time thereof is preferably 0.05~1 hours.

Further, the atmosphere gas during the firing process is preferably a reducing atmosphere gas. As the atmosphere gas, for example, the gas mixture of $N_2$ and $H_2$ humidified can be used. The oxygen partial pressure is preferably $10^{-6}$~$10^{-2}$ Pa.

In addition, the above-mentioned firing process can also be performed by using a hot-pressing method, HIP processing or the like.

The holding temperature in the annealing process is preferably 650~1100° C., and the holding time is preferably 0.1~24 hours. Further, the atmosphere gas of the annealing process is preferably the humidified $N_2$ gas (the oxygen partial pressure: $1.0 \times 10^{-3}$~1.0 Pa).

When the $N_2$ gas or the gas mixture is humidified in the binder removal process, the firing process, and the annealing process described above, for example, wetter or the like may be used.

The binder removal process, the firing process, and the annealing process may be performed continuously, and also may be performed independently. In addition, the firing process, and the annealing process may be carried out several times if necessary.

The method for forming the continuous film is not particularly limited, and there are methods such as a method of contacting the plate body containing constituting elements in the firing process and the annealing process, a method of coating the oxides after the annealing process, a method of forming film by membrane process or the like. As the membrane process, there is not particularly limited, and sputtering method, vacuum deposition method, CVD method or the like can be exemplified.

In addition, when an oxide is coated after the annealing process or forming a film by membrane process, the annealing process may be carried out several times if necessary.

For the capacitor element body 10 obtained as above, the polishing of end face is performed by barrel polishing or sand blasting or the like, for example, and the paste for external electrodes is coated, then fired, whereby the external electrodes 6 are formed. Then, if necessary, on the surface of the external electrodes, the coating layers are formed by plating or the like.

EXAMPLES

The present invention will be explained below in more detail based on examples, but the present invention is not limited to these examples.

Example 1

In the present example, a laminate-type ceramic electronic component was prepared which had a dielectric layer with a composition of $(Ba_{0.96}Ca_{0.04})(Ti_{0.85}Zr_{0.15})O_3$+MgO (0.1 parts by mass)+MnO (0.3 parts by mass)+$Y_2O_3$ (0.4 parts by mass)+$SiO_2$ (0.3 parts by mass)+$V_2O_5$ (0.05 parts by mass).

First, material powders of $BaTiO_3$, $CaTiO_3$, $BaZrO_3$, $MgCO_3$, $MnCO_3$, $Y_2O_3$, $SiO_2$ with a diameter of 0.1~1 μm were wet mixed for 16 hours in a ball mill and then dried, and thereby dielectric powders were prepared.

With respect to 100 parts by mass of dielectric powders, 4.8 parts by mass of acrylic resin, 100 parts by mass of ethyl acetate, 6 parts by mass of mineral spirit, 4 parts of toluene were mixed in a ball mill to make a paste, and thus the paste for dielectric layer was obtained.

Then, with respect to 100 parts by mass of Ni particles with an average diameter of 0.15 µm, 40 parts by mass of organic vehicle (obtained by solving 8 parts by mass of ethyl cellulose in 92 parts by mass of butyl carbitol) and 10 parts by mass of butyl carbitol were mixed by 3 rolls to make a paste, and thus the paste for internal electrode layer was obtained.

By using the obtained paste for dielectric layer, sheet formation on the PET film was performed by doctor blade method and drying was performed, whereby a green sheet was formed. At this time, the thickness of the green sheet was adjusted so as to make the thickness of the outer layer part be 0.7 µm. After printing electrode layers thereon, the sheet was peeled off from the PET film. Then, by laminating a plurality of green sheets having the electrode pattern layers printed thereon and green sheets for outer layer, adding pressure on them to make them bonded, green chips were obtained. At this time, the thickness was adjusted so as to make the thickness of the outer layer part after sintering be 15 µm.

Then the green chip was cut to a predetermined size, and the binder removal process, the firing process, the annealing process, and the continuous film forming process were performed under the following conditions. A laminated sintered ceramic body (element body) was obtained.

The binder removal process was performed under the following conditions.
Temperature increasing rate: 50° C./h
Holding temperature: 250° C.
Holding time: 8 hours
Temperature decreasing rate: 200° C./h
Atmosphere: air The firing process was performed under the following conditions.
Temperature increasing rate and decreasing rate: 1000° C./h
Holding temperature: 1200° C.
Holding time: 0.1 hours
Atmosphere: $2.0 \times 10^{-5}$ Pa Then, annealing process and continuous film forming process were performed. First, a pair of plate bodies formed of SiC sandwiched the fired chip so as to contact the surface of the outer layer of the fired chip. Then load was added to apply a pressure of 0.5 MPa on the fired chip.

The state was maintained, while annealing and continuous film forming was performed simultaneously under the following conditions.
Temperature increasing rate and decreasing rate: 200° C./h
Holding temperature: 1000° C.
Holding time: 2 hours
Atmosphere: $3.0 \times 10^{-2}$ Pa Further, the atmosphere during the firing and the reoxidation was mixing atmosphere of $H_2$ and humidified $N_2$.

A Cu paste was coated as terminal electrodes on the both surfaces of the element body obtained as above, and then fired in the $N_2$ atmosphere under a temperature of 800° C., and thus a laminated ceramic capacitor was obtained.

The size of the obtained laminated ceramic capacitor except the terminal electrode part was 1.0 mm×0.5 mm×0.21 mm, and the number of the dielectric layers sandwiched by the internal electrode layers was 130. The thickness of each dielectric layer was 0.7 µm, and the thickness of the internal electrode layer was 0.7 µm.

Figure 2:
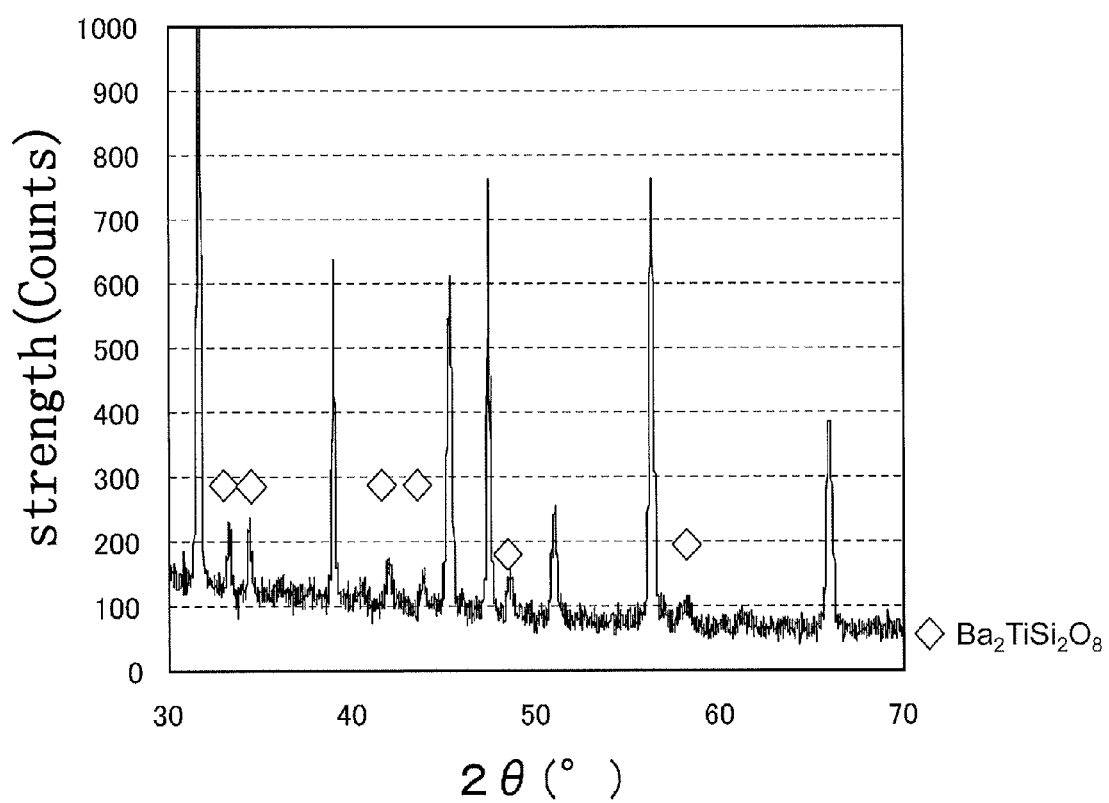
FIG. 2 is an X-ray diffraction pattern of the outer layer part of the laminated ceramic capacitor according to example 1 of the present invention.
Figure 3:
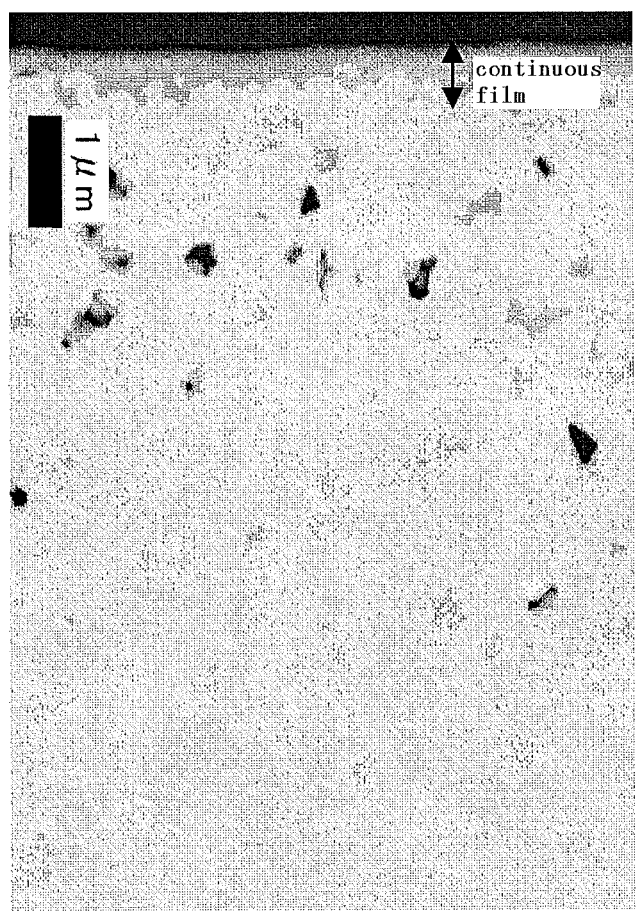
FIG. 3 is a photograph taken by a scanning electron microscope (SEM) of the outer layer part of the cross section of the laminated ceramic capacitor according to example 1 of the present invention.

It was confirmed that the crystal structure in the continuous film of the obtained capacitor was $Ba_2TiSi_2O_8$ after measured by X-ray diffraction method (XRD). The measuring result was shown in FIG. 2. Further, It was confirmed that the obtained capacitor sample was cut in a plane parallel to the laminating direction, the cross section was observed with scanning electronic microscope (SEM), and continuous film composed of continuous film was formed. The observed image was shown in FIG. 3.

Example 2

Manufacturing was done in the same manner as in Example 1, except that the continuous film forming process was performed at the same time with the firing process.

Further, it could be confirmed that the crystal structure of the continuous film in the obtained capacitor comprises $Ca_2TiSi_2O_8$ as well as $Ba_2TiSi_2O_8$ after measured by X-ray diffraction method (XRD).

Example 3

Manufacturing was done in the same manner as in Example 2, except that a plate body composed of $Ba_2TiSi_2O_8$ was used in the continuous film forming process.

Further, it could be confirmed that the crystal structure of the continuous film in the obtained capacitor comprises $BaTiSiO_5$ as well as $Ba_2TiSi_2O_8$ after measured by X-ray diffraction method (XRD).

Example 4

Manufacturing was done in the same manner as in Example 1, except that a plate body composed of $BaTiSiO_5$ was used in the continuous film forming process. Further, it could be confirmed that the crystal structure of the continuous film of the obtained capacitor was $BaTiSiO_5$ after measured by X-ray diffraction method (XRD).

Example 5

Manufacturing was done in the same manner as in Example 1, except that a plate body composed of $SiO_2$ was used in the continuous film forming process and the holding temperature of the annealing process was 850° C.

Further, it could be confirmed that the crystal structure of the continuous film of the obtained capacitor was $BaTiSi_2O_7$ and $BaTiSi_3O_9$ after measured by X-ray diffraction method (XRD).

Comparative Example 1

Manufacturing was done in the same manner as in Example 1, except that a $SiO_2$ target was used to perform the continuous film forming process by sputtering method after the annealing process.

Comparative Example 2

Manufacturing was done in the same manner as in Example 1, except that the continuous film forming process was performed by attaching the glass powders composed of B—Si—Zn—Al onto the surfaces of the outer layer part and then holding for 1 hour under a temperature of 700° C. after the annealing process.

Comparative Example 3

Manufacturing was done in the same manner as in Example 1, except that the continuous film forming process was not performed.

<Evaluation of Bending Strength>

The three point bending strength was measured. The measuring conditions was set as the distance between the supporting points L=0.5 mm and the load velocity=1 mm/sec, and the bending strength F of the laminated ceramic capacitor was calculated from the load P when breaking and the following formula.

$$F=(3\times P\times L)/(2\times w\times t^2)$$

Wherein, w is the width of the laminated ceramic capacitor, t is the thickness of the laminated ceramic capacitor. The bending strengths F were measured for 100 laminated ceramic capacitors and their average value was obtained.

<Evaluation of Thermal Shock Resistance>

Heat treatment cycle composed of the following processes (i) to (iv) was applied to the laminated ceramic capacitor. One heat treatment cycle was composed of the following processes: (i) a process of holding the substrate and the chip-type electronic component TC for 30 minutes under a temperature condition in which the temperature of the element body 1 was set as −55° C.; (ii) a process of increasing the temperature of element body 1 up to 125° C. within a time (3 min) of 10% of the holding time; (iii) a process of holding for 30 minutes under a temperature condition in which the temperature of the element body 1 was set as 125° C.; and (iv) a process of decreasing the temperature of element body 1 down to −55° C. within a period time (3 min) of 10% of the holding time.

As for 100 laminated ceramic capacitors, three point bending strength was measured after the heat treatment cycle was repeated for 1000 times. Those in which the bending strength F is less than 60% of the average strength obtained in the evaluation of bending strength, the sample was judged to be failure and then the failure rate was calculated.

The failure rate after one heat treatment cycle was repeated for 1500 times was obtained in the same manner. The result was shown in table 1.

As could be seen from table 1, when the continuous film was formed by Ba—Si—Ti—O based crystal phase, it could be confirmed that not only the bending strength was increased but also no degradation of the bending strength was found even when a thermal shock was applied.

In addition, it could be known that in the case of the continuous film with $Ba_2TiSi_2O_8$ as the main phase, the thermal shock resistance becomes more excellent.

On the other hand, it could be confirmed that the bending strength was degraded due to thermal shock and the failure rate was high in comparative example 1 and comparative example 2.

Example 6~25

The thickness of the outer layer part and the thickness of the continuous film were adjusted in the same manner as in example 1.

The thicknesses of the continuous film was adjusted by setting the holding temperature of the annealing process and the continuous film forming process of example 1 in the range of 950° C. to 1050° C. and setting the holding time in the range of 1~30 hours, and thus the desired thicknesses of the continuous film was obtained.

The thicknesses of the outer layer part and the continuous film, and the ratio of the thickness of the continuous film with respect to the thickness of the outer layer part were shown in table 2.

For the evaluation of bending strength, in addition to the average value of the bending strength F was calculated with respect to 100 laminated ceramic capacitors, the geometry parameter which represents the deviation of the bending strength was also calculated by weibull analysis. The larger the geometry parameter is, the smaller the deviation is, and is preferable 15.

If the number of times for the heating treatment cycle was 1000 times or 1500 times, failure in anyone of examples 6 to 25 did not occur, thus the number of times was set as 3000 times. Those in which the bending strength F obtained in the evaluation of bending strength is less than 60% of the average strength were judged to be failure. The failure rate was preferable less than 40%.

TABLE 1

| | Composition of the continuous film | | Bending strength | failure rate after thermal shock | |
| --- | --- | --- | --- | --- | --- |
| | Main phase | Secondary phase | (MPa) | After 1000 cycles | After 1500 cycles |
| Example 1 | $Ba_2TiSi_2O_8$ | — | 418 | 0/100 | 0/100 |
| Example 2 | $Ba_2TiSi_2O_8$ | $Ca_2TiSi_2O_8$ | 410 | 0/100 | 0/100 |
| Example 3 | $Ba_2TiSi_2O_8$ | $BaTiSiO_5$ | 415 | 0/100 | 0/100 |
| Example 4 | $BaTiSiO_5$ | — | 397 | 0/100 | 8/100 |
| Example 5 | $BaTiSi_2O_7$ | $BaTiSi_3O_9$ | 395 | 0/100 | 7/100 |
| Comparative example 1 | $SiO_2$ | — | 377 | 20/100 | 48/100 |
| Comparative example 2 | B—Si—Zn—Al glass | | 405 | 15/100 | 39/100 |
| Comparative example 3 | none | | 345 | — | — |

TABLE 2

|  | Thickness of the continuous film (μm) | Thickness of the dielectric outer layer part (μm) | Ratio of the thickness | Average value of the bending strength (MPa) | geometry parameter of the bending strength | Failure rate after thermal shock after 3000 cycles |
|---|---|---|---|---|---|---|
| Example 6 | 0.1 | 10.1 | 1.0% | 335 | 8.2 | 33/100 |
| Example 7 | 0.2 | 10.2 | 2.0% | 375 | 17.3 | 0/100 |
| Example 8 | 0.5 | 10.5 | 4.8% | 377 | 19.7 | 0/100 |
| Example 9 | 1 | 11 | 9.1% | 388 | 26.5 | 0/100 |
| Example 10 | 2 | 12 | 16.7% | 399 | 21.1 | 0/100 |
| Example 11 | 2.5 | 12.5 | 20.0% | 403 | 17.5 | 0/100 |
| Example 12 | 4 | 14 | 28.6% | 407 | 17.1 | 15/100 |
| Example 13 | 0.1 | 25.1 | 0.4% | 402 | 8.8 | 27/100 |
| Example 14 | 0.2 | 25.2 | 0.8% | 405 | 16.1 | 15/100 |
| Example 15 | 0.3 | 25.3 | 1.2% | 411 | 20.1 | 0/100 |
| Example 16 | 0.5 | 25.5 | 2.0% | 418 | 27.4 | 0/100 |
| Example 17 | 1 | 25.1 | 4.0% | 445 | 23.6 | 0/100 |
| Example 18 | 4 | 29 | 13.8% | 468 | 15.5 | 0/100 |
| Example 19 | 6 | 31 | 19.4% | 421 | 10.5 | 19/100 |
| Example 20 | 0.2 | 40.2 | 0.5% | 433 | 16.6 | 7/100 |
| Example 21 | 0.5 | 40.5 | 1.2% | 441 | 18.9 | 0/100 |
| Example 22 | 2 | 42 | 4.8% | 461 | 28.8 | 0/100 |
| Example 23 | 4 | 44 | 9.1% | 453 | 18.2 | 0/100 |
| Example 24 | 6 | 46 | 13.0% | 390 | 11.9 | 5/100 |
| Example 25 | 10 | 50 | 20.0% | 366 | 10.1 | 0/100 |

As could be seen from table 2 that if the thickness of the continuous film was 0.2~0.4 μm the thickness of the outer layer, it could be known that the geometry parameter of the bending strength become excellent. In addition, if the thickness of the continuous film was 1~20% with respect to the outer layer part, the thermal shock resistance was further improved.

The present invention can provide a laminate-type ceramic electric component which has excellent mechanical strength and also has thermal shock resistance at the same time. In addition, the present invention is not only suitable applied in laminated ceramic capacitor, but also can be suitably applied in other surface-mount-type electronic components such as varistor, thermistor, hybrid LC component or the like.

DESCRIPTION OF REFERENCE NUMERALS

1 laminate-type ceramic electronic component (laminated ceramic capacitor)
2a dielectric layer
2b outer layer part
3 internal electrode layer
4 end surface of the element body
5 continuous film
6 terminal electrode
10 element body

What is claimed is:

1. A laminate-type ceramic electronic component which is a stack comprising:
   an inner layer part, in which dielectric layers comprising $ABO_3$ (which represents a perovskite crystal in which A contains at least Ba and B contains at least Ti) as a main component and internal electrode layers are alternately laminated; and
   a pair of outer layer parts which sandwich said inner layer part,
   wherein said outer layer parts comprise a continuous film containing a Ba—Si—Ti—O based crystal phase as a main component, and
   an area ratio of the outer layer part which is exposed without being covered by the continuous film is 10% or less.

2. The laminate-type ceramic electronic component according to claim 1, wherein,
   said Ba—Si—Ti—O based crystal phase contains a fresnoite crystal phase as main phase.

3. The laminate-type ceramic electronic component according to claim 1 wherein,
   the thickness of said continuous film is 0.2~4.0 μm.

4. The laminate-type ceramic electronic component according to claim 1 wherein,
   the thickness of said continuous film is 1~20% relative to each of said outer layer part.

5. The laminate-type ceramic electronic component according to claim 2, wherein,
   the thickness of said continuous film is 0.2~4.0 μm.

6. The laminate-type ceramic electronic component according to claim 2, wherein,
   the thickness of said continuous film is 1~20% relative to each of said outer layer part.

7. The laminate-type ceramic electronic component according to claim 3, wherein,
   the thickness of said continuous film is 1~20% relative to each of said outer layer part.

8. The laminate-type ceramic electronic component according to claim 5, wherein,
   the thickness of said continuous film is 1~20% relative to each of said outer layer part.

* * * * *